United States Patent Office 3,767,777
Patented Oct. 23, 1973

3,767,777
METHOD OF SEPARATING SULFUR DIOXIDE FROM GASEOUS MIXTURES
Elroy E. Frye and Harold L. Trentham, Houston, Tex., assignors to Trentham Corporation
Filed Feb. 23, 1972, Ser. No. 228,612
Int. Cl. C01b 17/56
U.S. Cl. 423—575
10 Claims

ABSTRACT OF THE DISCLOSURE

Sulfur dioxide is preferentially absorbed from a gaseous mixture containing sulfur dioxide by intimate, countercurrent contact between the gas stream and a solution containing a water soluble trialkyl phosphate. A concentrated stream of sulfur dioxide is obtained by regeneration of the absorbing solution.

BACKGROUND OF THE INVENTION (1) Field of the invention

Sulfur dioxide is a common constituent of industrial plant vent gas streams and flue gases resulting from the combustion of fossil fuels with air. The venting of sulfur dioxide to the atmosphere in such gas streams constitutes an undesirable pollution of the environment. The present invention is directed to the removal of sulfur dioxide from such gas streams by contacting such gaseous mixtures with an aqueous solution containing a water soluble trialkyl phosphate. More particularly, this invention is directed to the preferential absorption of sulfur dioxide from gaseous mixtures containing other gases such as carbon dioxide whereby a relatively small amount of carbon dioxide is absorbed along with the sulfur dioxide. Still further, as part of the present invention is the arrangement of equipment necessary to provide commercially acceptable processes and the specific application of the present invention to the removal of sulfur dioxide from various gas mixtures.

(2) Prior art

The following U.S. patents were cited in a patentability art search: 1,972,883; 1,995,545; 2,139,375; 2,196,004; 2,225,744; 2,251,216; 2,765,217; 2,987,379; 3,023,088; 3,050,370; 3,099,535; 3,108,855; 3,161,461; 3,170,766; 3,284,162; 3,318,666; 3,398,227; 3,441,379; 3,447,903; 3,535,083; 3,538,681; 3,547,583; 3,555,782; 3,561,925; 3,590,555.

SUMMARY OF THE INVENTION

The present invention relates to the separation of sulfur dioxide from gas mixtures. More particularly, the discovery that an aqueous solution containing a water soluble trialkyl phosphate will preferentially absorb sulfur dioxide in the presence of other acid gases such as carbon dioxide, is embodied within novel process schemes for particular applications.

DESCRIPTION OF THE PREFERRED EMBODIMENTS

The present invention is directed to the preferential absorption of sulfur dioxide from gaseous mixtures containing other acid gases such as carbon dioxide by contacting such gaseous mixtures with an aqueous solution containing a water soluble trialkyl phosphate. The suitable trialkyl phosphates are those lower alkyls ($C_1$ to $C_4$) which are water soluble, and the preferred trialkyl phosphate is triethyl phosphate. It has been found according to the present invention that the water soluble trialkyl phosphates such as triethyl phosphate or tripropyl phosphate will preferentially absorb from a gaseous mixture the sulfur oxide gases. Furthermore, it has been found that if the absorbing solution contains at least 5% of water that these trialkyl phosphates have a boiling point such that steam may be used to boil the solution in the regeneration of the absorbing solution. Hence, it is preferred to utilize an aqueous solution with the amount of water being present preferably in an amount of at least 5%.

The present invention may be employd in various specific applications to remove sulfur dioxide from various gas mixtures. Several specific applications in which the present invention may be utilized are:

(a) Absorption of sulfur dioxide from the tail gas vented from a conventional Claus-type elemental sulfur recovery unit;

(b) Absorption of sulfur dioxide from the gas stream vented from the regenerator of a conventional oil refinery catalytic cracking unit; and (c) Absorption of sulfur dioxide from the flue gases resulting from combustion of fossil fuel.

Figure 1:
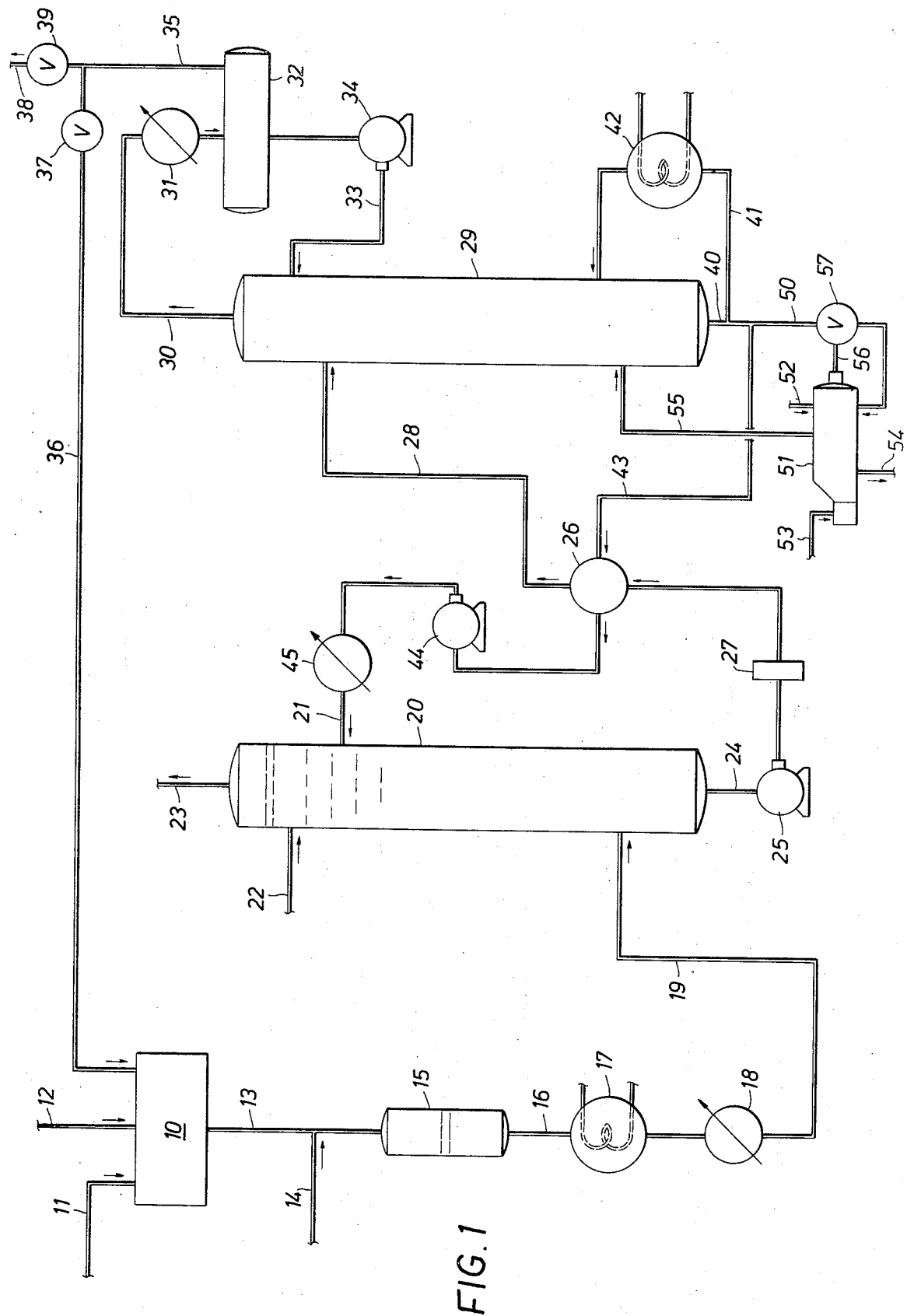
FIG. 1 is a schematic diagram directed to the removal of sulfur dioxide according to the present invention from the tail gas of a Claus-type sulfur recovery unit.

Referring to FIG. 1, the present invention is described as applied to a conventional Claus-type process for the production of sulfur. In a Claus-type sulfur recovery unit, hydrogen sulfide is converted to sulfur by oxidation usually with air either with or without a catalyst under a variety of conditions. The following reactions are commonly believed to occur:

$$H_2S + 1.5O_2 \rightarrow SO_2 + H_2O$$
$$2H_2S + SO_2 \rightarrow 3S + 2H_2O$$
$$H_2S + 0.5O_2 \rightarrow S + H_2O$$

The second and third reactions above do not go to completion, so there is not complete conversion of the hydrogen sulfide to sulfur. Many attempts have been made to approach complete conversion but the conversion seldom runs above 90% to 95% in the process as generally employed.

According to the present invention, an absorbing solution which comprises a water soluble trialkyl phosphate has been found which will preferentially absorb sulfur dioxide from gaseous mixtures. In one of the preferred embodiments, this discovery is utilized in conjunction with the Claus-type sulfur recovery unit wherein all sulfur containing matter in the flue gas is converted by oxidation to sulfur dioxide which can then be absorbed by use of the aqueous water soluble trialkyl phosphate solution according to the present invention.

A Claus-type sulfur recovery unit 10 is shown schematically in FIG. 1. To the unit 10 is introduced a hydrogen sulfide feeds gas by line 11. Air is also introduced into unit 10 by line 12. Because of the incomplete conversion in a Claus-type unit, sulfur containing compounds remain in the flue gas stream 13 such as hydrogen sulfide, carbonyl sulfide, carbon disulfide, sulfur vapor and sulfur dioxide.

To convert all the sulfur containing compounds to sulfur dioxide, air is introduced by line 14 and the combined mixture of gases is introduced into a sulfur oxidizer 15. In the sulfur oxidizer 15, all of the sulfur containing compounds and any sulfur in the tail gas stream 13 are converted to sulfur dioxide. The gas from the sulfur oxidizer 15 may be removed by line 16 through a waste heat recovery unit 17. The cooled gases may be further cooled by passing them through a cooler 18 whereby the gases are cooled to a temperature which may suitably be about 120° F. or less.

The cooled gas stream containing the sulfur dioxide is then passed by line 19 into the bottom of a countercurrent gas-liquid absorption unit 20 which contains a number of vapor liquid contacting stages. The sulfur containing gases, specifically the sulfur dioxide, is preferentially absorbed in the absorption unit 20. Into the upper portion of the unit 20 according to the present invention is introduced a solution containing a water soluble trialkyl phosphate through line 21, the trialkyl phosphate being preferably the triethyl phosphate. Water is introduced into unit 20 by line 22 above line 21 or the point of introduction of the trialkyl phosphate to prevent loss of the trialkyl phosphate as the gas stream passes through the unit 20 and the sulfur-free gas is removed through vent line 23. The line 19 gaseous mixture may contain small amounts of sulfur trioxide although the sulfur dioxide predominates. The gas stream in intimate contact in countercurrent flow with the aqueous solution containing a water soluble trialkyl phosphate results in essentially all of the sulfur oxides being preferentially absorbed. The solution containing the absorbed sulfur dioxide and any sulfur trioxide is removed from the bottom of unit 20 through line 24 where it is pumped by pump 25 through a heat exchanger 26. A filter 27 may be employed between the pump 25 and the heat exchanger 26. After passing through the heat exchanger 26, the solution containing absorbed sulfur dioxide is then passed through line 28 to a regenerating vessel 29. The regenerating vessel 29 may be a distillation column wherein the solution is introduced into the upper portion of the column to be regenerated. The sulfur dioxide gas is removed from the boiling solution in the vessel 29 and flows from the top of vessel 29 through line 30 wherein it is cooled by a cooler 31. In cooling the separated gaseous stream, a certain amount of water is condensed and collected in vessel 32 wherein it is recycled through line 33 by pump 34 and reintroduced into the top of the column 29 at a point above the introduction of the solution containing the absorbed sulfur dioxide to prevent loss of the trialkyl phosphate from the vessel 29. The concentrated sulfur dioxide stream is removed from vessel 32 by line 35 wherein it may be recycled by line 36 back to the Claus-type sulfur recovery unit 10 where it is converted to sulfur. A valve 37 in line 36 may control the amount recycled or the concentrated sulfur dioxide stream may be removed through line 38 which is controlled by valve 39.

The trialkyl phosphate solution free of the sulfur dioxide is removed from the bottom of vessel 29 by line 40. A heating recycle stream may be taken from line 40 through line 41 for addition of heat to column 29, the heat being added through a heat exchanger 42 in the recycle line 41. The sulfur dioxide free trialkyl phosphate solution is recirculated through line 43 through the heat exchanger 26 where it is then passed on through a pump 44 to a cooler 45 prior to reinjection into the unit 20 through line 21.

A solution purification cycle is provided whereby a portion of the sulfur dioxide free solution is removed from line 40 through line 50 whereby it is introduced into a purifier 51. Into the purifier 51 may be introduced a caustic such as soda ash by line 52 wherein it is intimately contacted with the solution. Steam is introduced by line 53 to provide heat for operation of the purifier 51. When soda ash is used, a reaction occurs with the production of sodium sulfate which concentrates in the purifier 51 and is removed by line 54. The purified trialkyl phosphate solution is then recirculated in the vapor phase through line 55 to the vessel 29. The amount of solution passed through the purification cycle may be controlled by a level device 56 and valve 57 in line 50. As pointed out hereinabove, sulfur trioxide may be present which can be thus removed by the disclosed purification cycle as inorganic sulfate as well as the removal of other impurities which may be present in the system. The purification cycle, therefore, allows recycle of clean trialkyl phosphate solution to the absorption unit 20 to intimately contact the gaseous mixture for the preferential absorption of the sulfur oxide, predominantly the sulfur dioxide.

Figure 2:
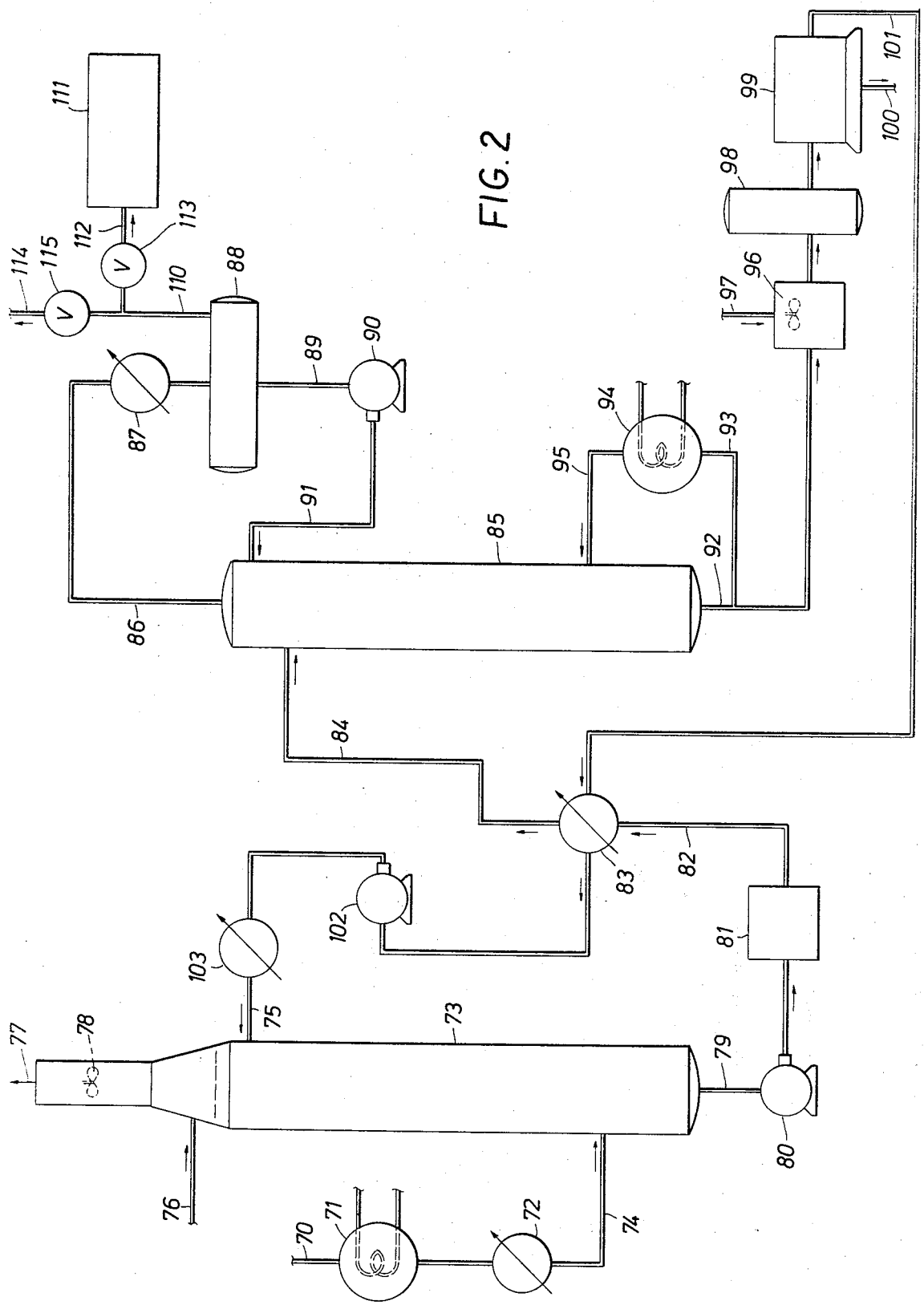
FIG. 2 is a schematic diagram showing the preferential absorption of sulfur dioxide from a different gaseous stream and specifically from a refinery catalytic cracking unit regenerator flue gas stream.

The present invention may also be employed to absorb sulfur dioxide from various gas streams, for example, the gas stream vented from the regenerator of a conventional oil refinery catalytic cracking unit as shown in FIG. 2. This specific arrangement of the apparatus may also be employed to recover the sulfur dioxide from the flue gases resulting from the combustion of fossil fuels or other gaseous streams containing sulfur oxides. Referring to FIG. 2, a gas stream such as that from the vent gas from a catalytic cracking unit is introduced through line 70, a waste heat recovery unit 71, and a cooler 72 to a countercurrent gas-liquid absorption unit 73 which contains a number of vapor liquid contacting stages. The gas is introduced into the unit 73 at the bottom portion through line 74. Into the upper portion of the unit 73 according to the present invention is introduced a solution containing a water soluble trialkyl phosphate through line 75. Water may be introduced into the unit 73 by line 76 which is positioned above line 75 to prevent loss of the trialkyl phosphate introduced into the unit 73. The water in the upper trays or stages prevents the loss of the trialkyl phosphate as the gases pass in countercurrent contact therewith and are removed through the vent line 77 at the top of the unit 73. In certain cases, the pressure of the incoming gases is insufficient to be of enough driving force to pass the gases in countercurrent contact with the solution of the water soluble trialkyl phosphate in the unit 73. In this case, it is preferred to have a fan 78 in the vent stack of the unit 73. When the gaseous mixture being treated according to the present invention is the vent gases from a catalytic cracking unit, not only are the sulfur containing gases preferentially absorbed, i.e. the sulfur dioxide and sulfur trioxide but also the catalyst fines are maintained within the solution of the trialkyl phosphate which are then removed from the unit 73 by line 79. The solution is then pumped by pump 80 through a filter 81 which will remove the catalyst fines as well as any other solid which may have been in the gaseous mixture. The solution containing the absorbed sulfur oxides is then passed by line 82 through a heat exchanger 83 and then line 84 into the top portion of a regenerator vessel 85. The sulfur dioxide gas is removed from the top of column 85 through line 86 where it is cooled in a cooler 87 condensing some of the water and passing into a collecting vessel 88. From the collecting vessel the water and other condensed materials are taken by line 89 and pumped by pump 90 back into the top portion of the unit 85 through line 91.

The trialkyl phosphate solution free of the sulfur dioxide is removed from the bottom of the vessel 85 by line 92. A heating recycle stream may be taken from line 92 through line 93 wherein it is passed through a heat exchanger 94 for heating and reintroduced into the bottom of the unit 85 by line 95.

When the gaseous mixture being treated is that from a catalytic cracking unit, the gases may contain substantial amounts of sulfur trioxide. To prevent buildup of impurities in the solution in this case, the entire solution may be treated by passing through line 92 to a mixing vessel 96 wherein a purifying agent such as calcium hydroxide may be introduced by line 97. After mixing well in the mixing tank 96, the solution is passed through a holding tank 98 to a filter 99 whereby the resulting precipitate, calcium sulfate when calcium hydroxide is employed as the purifying agent, is removed by line 100. The purified solution of the trialkyl phosphate is then removed from the filter 99 by line 101 wherein it is passed through heat exchanger 83 and pumped by pump 102 through the heat exchanger 103 back into the top portion of unit 73 by line 75.

It is clear that the particular purification cycle employed is dependent upon the nature of the impurities that may be present in the gaseous mixture being treated according to the present invention. Accordingly, the size of the particular equipment, whether a rotary filter or some other type filter device is employed, and other choices regarding equipment are merely matters of good engineering design.

In the embodiment of FIG. 2, it may be desirable to utilize in minor amounts such as less than five (5) percent of a phosphate other than the water soluble trialkyl phosphates. A preferred phosphate is tripotassium phosphate which would be used to control pH of the circulating solution. Other alkali metal phosphates may be employed but only in minor amounts.

From the collecting vessel 88 a concentrated sulfur dioxide stream is removed by line 110. According to one specific aspect of the present invention, the concentrated sulfur dioxide stream which is obtained from a refining unit such as a catalytic cracking unit or other catalyst unit regenerator may then be passed to a conventional Claus-type sulfur recovery unit 111 through a line 112 controlled by valve 113. Otherwise the sulfur dioxide may be utilized in a different manner by passing it through line 114 controlled by valve 115.

In another application, the gaseous mixture treated according to the present invention may be the flue gas from a power plant using high sulfur fuel such as coal. The concentrated sulfur dioxide may then be reduced to elemental sulfur with reducing agents other than hydrogen sulfide. Suitable reducing reagents are hydrogen or carbonaceous material, such as fuel oil, natural gas or elemental carbon.

The present invention will be further illustrated by the following specific examples which are given by way of illustration and not as limitations on the scope of the invention.

EXAMPLE 1

A mixture of carbon dioxide, sulfur dioxide and nitrogen containing water vapor was contacted by an aqueous solution of triethyl phosphate which had been freed of absorbed gases. The aqueous solution contained approximately ten (10) percent by weight water, the remainder being triethyl phosphate. The gaseous mixture contained approximately 2.3% sulfur dioxide, 16% carbon dioxide, the remainder being nitrogen and the amount of water vapor which the gas stream could contain in the vapor phase.

The treated gas resulting from contacting with the triethyl phosphate solution contained less than one part per million of sulfur dioxide. It was determined by gas analysis that the triethyl phosphate solution had absorbed essentially all of the sulfur dioxide in the original gas mixture and less than five (5) percent of the carbon dioxide contained in the original gas mixture. The above contacting was done in a countercurrent manner at essentially atmospheric pressure and 100° F. temperature.

The triethyl phosphate solution was separated from the gas being contacted and removed to a regenerator where heat was applied to produce boiling of the solution, and countercurrent contact of solution containing sulfur dioxide with solution vapors generated by the application of heat. The result of this operation produced a gas stream containing sulfur dioxide and equilibrium quantities of other gases absorbed previously by the solution, and regenerated solution essentially free of absorbed gases.

EXAMPLE 2

A gas mixture of essentially the same composition, and at the same conditions of temperature and pressure as Example 1 was treated in the same equipment and in the same operating manner as Example 1 with solution of commercial grade triethyl phosphate containing no added water.

Removal of sulfur dioxide from the gas mixture was effected to produce an effluent gas containing less than 1 part per million of sulfur dioxide yet containing all but a very small amount of the other constituents of the original gas mixture.

Measurements determined that the triethyl phosphate alone had preferentially absorbed the sulfur dioxide from the gas mixture; however, a greater ratio of contacting liquid to gas was required to achieve the same end result as when ten (10) percent by weight water and ninety (90) percent by weight triethyl phosphate solution was employed as in Example 1.

The nature and object of the present invention having been described and illustrated and the best mode thereof contemplated set forth, what we wish to claim as new and useful and secure by Letters Patent is:

1. A method for preferentially absorbing sulfur dioxide from a gaseous mixture which comprises
    passing said gaseous mixture in intimate, countercurrent contact with a solution containing a water soluble trialkyl phosphate.
2. A method according to claim 1 wherein said solution contains at least five (5) percent water.
3. A method according to claim 1 wherein said trialkyl phosphate is triethyl phosphate.
4. A method according to claim 1 wherein said gaseous mixture is from the tail gas vented from a conventional Claus-type unit which has been oxidized to convert sulfurous matter to predominately sulfur dioxide.
5. A method according to claim 1 wherein said gaseous mixture is from the flue gases resulting from the combustion of fossil fuel.
6. A method according to claim 1 wherein there is present in the solution a minor amount of an inorganic phosphate.
7. A method according to claim 1 wherein said gaseous mixture is from the regenerator of a conventional oil refinery catalytic cracking unit.
8. A method for preferentially absorbing sulfur dioxide from the flue gas stream of a catalytic cracking unit and recovering same as elemental sulfur which comprises
    passing said gaseous mixture in contact with a water soluble trialkyl phosphate according to claim 1;
    regenerating said trialkyl phosphate solution by stripping a concentrated steam of sulfur dioxide from said solution; and
    passing said sulfur dioxide stream to a Claus-type sulfur recovery unit.
9. A method for preferentially absorbing sulfur dioxide from the flue gas stream of a catalytic cracking unit and recovering same as elemental sulfur which comprises
    passing said gaseous mixture in contact with an absorbent for sulfur dioxide;

regenerating said absorbent by stripping a concentrated stream of sulfur dioxide from said solution; and passing said sulfur dioxide stream to a Claus-type sulfur recovery unit.

10. A method for preferentially absorbing sulfur dioxide from a flue gas stream and recovering same as elemental sulfur which comprises passing said gaseous mixture in contact with a water soluble trialkyl phosphate solution according to claim 1;

regenerating said solution to produce a concentrated stream of sulfur dioxide; and reacting said sulfur dioxide with a reducing agent to form elemental sulfur.

References Cited

UNITED STATES PATENTS

| 2,031,802 | 2/1936 | Tyrer | 423—243 |
| 2,142,987 | 1/1939 | Bacon et al. | 423—242 |
| 3,334,469 | 8/1967 | Deieher et al. | 55—73 X |

FOREIGN PATENTS

| 1,803,147 | 6/1969 | Germany | 423—574 |

GEORGE O. PETERS, Primary Examiner

U.S. Cl. X.R.

55—73; 423—243, 539